(12) United States Patent
Luka et al.

(10) Patent No.: US 11,697,342 B2
(45) Date of Patent: Jul. 11, 2023

(54) PORTAL AXLE DRIVE FOR A DRIVE AXLE OF AN ELECTRIC VEHICLE

(71) Applicant: ZF Friedrichshafen AG, Friedrichshafen (DE)

(72) Inventors: Johannes Luka, Wegscheid (DE); Paul Lenz, Waldkirchen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 154 days.

(21) Appl. No.: 17/313,238

(22) Filed: May 6, 2021

(65) Prior Publication Data
US 2021/0347254 A1 Nov. 11, 2021

(30) Foreign Application Priority Data
May 7, 2020 (DE) ...................... 10 2020 205 733.8

(51) Int. Cl.
*B60K 17/04* (2006.01)
*B60K 7/00* (2006.01)

(52) U.S. Cl.
CPC .......... *B60K 17/046* (2013.01); *B60K 7/0007* (2013.01)

(58) Field of Classification Search
CPC .... B60K 17/046; B60K 17/02; B60K 17/043; B60K 17/04; B60K 17/22; B60K 7/0007; B60K 2007/0038; B60K 2007/0061; F16H 37/046; F16H 37/04; F16H 3/089; F16H 2200/0021; F16H 1/206; F16H 2003/007; F16H 2003/0931–0938; F16H 3/12; F16H 3/126; F16H 37/0826
See application file for complete search history.

(56) References Cited

U.S. PATENT DOCUMENTS

| | | | | |
|---|---|---|---|---|
| 4,774,857 A | * | 10/1988 | Heine | ...................... F16H 3/56 192/12 C |
| 5,919,109 A | * | 7/1999 | Fleckenstein | ........ B60K 17/046 475/151 |
| 2016/0003326 A1 | * | 1/2016 | Park | ...................... F16H 3/089 74/664 |
| 2019/0113120 A1 | * | 4/2019 | Sten | .......................... F16H 1/28 |

FOREIGN PATENT DOCUMENTS

| | | |
|---|---|---|
| DE | 3027806 C2 | 2/1982 |
| DE | 102004003649 A1 | 8/2005 |

OTHER PUBLICATIONS

DE 3027806 A1 machine translation (Year: 1982).*

* cited by examiner

Primary Examiner — Charles A Fox
Assistant Examiner — Farhana Pervin
(74) Attorney, Agent, or Firm — Dority & Manning, P.A.

(57) ABSTRACT

A portal axle drive for a vehicle axle of an electric vehicle with driving wheels includes a drive shaft (AN) with an input axis (a) and an output shaft (AB) with an output and wheel axis (b). The input axis (a) and the output axis (b) have an axial or portal offset (c). A first gear stage (Ü1) is arranged between the drive shaft (AN) and the output shaft (AB). In an axial direction, a second gear stage (Ü2) is arranged next to the first gear stage (Ü1) and an engagement device (SE) is arranged next to the second gear stage (Ü2). The first gear stage (Ü1) and the second gear stage (Ü2) are engageable via the engagement device (SE).

10 Claims, 4 Drawing Sheets

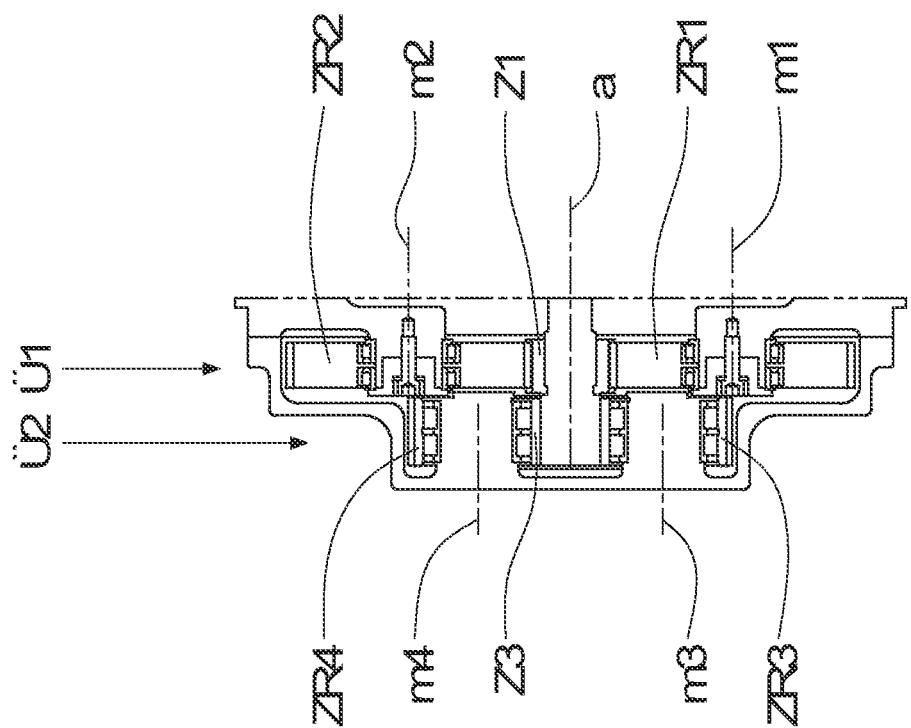
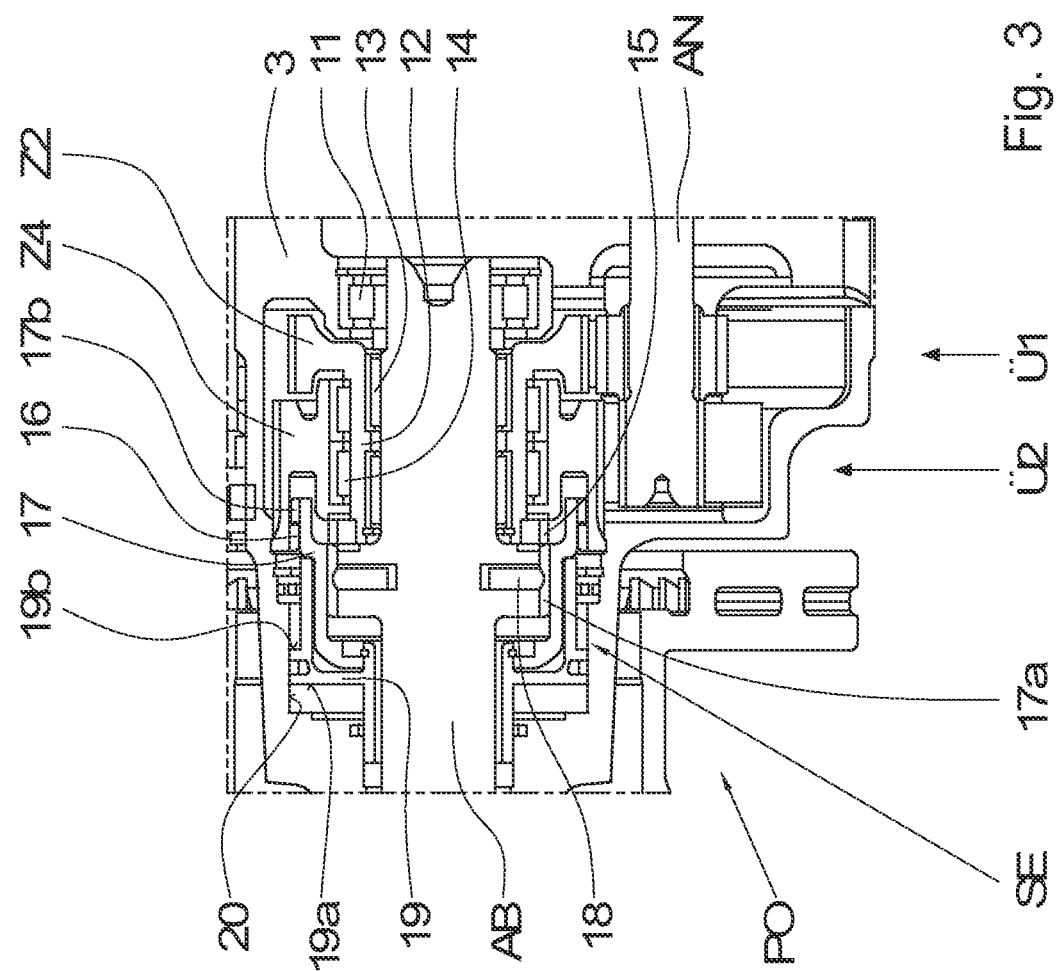
Fig. 3
Fig. 4

PORTAL AXLE DRIVE FOR A DRIVE AXLE OF AN ELECTRIC VEHICLE

CROSS-REFERENCE TO RELATED APPLICATION

The present application is related and has right of priority to German Patent Application No. 102020205733.8 filed in the German Patent Office on May 7, 2020, which is incorporated by reference in its entirety for all purposes.

FIELD OF THE INVENTION

The invention relates generally to a portal axle drive or portal drive for a drive axle of an electric vehicle with driving wheels, including a drive shaft with an input axis and an output shaft with an output or wheel axis, wherein the input axis and the output axis have an axial or portal offset, and wherein a first gear stage is arranged between the drive shaft and the output shaft.

BACKGROUND

Portal axle drives for vehicle axles are known. Portal axle drives have a portal offset, i.e., an offset between the drive axle, generally an axle shaft of the axle differential, and the wheel axle. As a result, either a higher ground clearance is achieved for the vehicle, namely for the case in which the drive axle is situated higher than the wheel axle, or a lower ground clearance, in particular in the case of low-profile vehicles, when the wheel axle is situated higher than the drive axle.

DE 10 2004 003 649 A1 describes a portal drive, which is also referred to as a portal axle drive, with a planetary gearbox, the ring gear of which includes an inner toothing as well as an outer toothing. The input is formed by the sun gear and/or the sun gear shaft, and the output takes place via an output gearwheel, which engages into the outer toothing of the ring gear. The axes of the sun gear shaft and of the output gearwheel have a vertical and a horizontal axial offset (portal offset).

DE 30 27 806 C2 describes a further embodiment of a portal axle drive, namely for a drive axle of a bus. The input of the portal drive takes place via an axle shaft of the axle differential, which is arranged off-center on the axle. The portal drive includes an input pinion driven by the axle shaft and an output gearwheel, which is arranged over the input pinion in the vertical direction and the axis of which corresponds to the wheel axis. Between the input pinion and the output gearwheel, two intermediate gearwheels are symmetrically arranged, which are each in mesh with the input pinion as well as with the output gearwheel. This known portal axle drive has a vertical portal offset, wherein the wheel axis is arranged above the input axis and, therefore, is suitable, in particular, for low-profile vehicles.

One problem associated with known vehicle axles driven by an electric machine is that either the achievable speed range is too low or the drive torque and/or the tractive force available at the drive axle are/is too low.

BRIEF SUMMARY OF THE INVENTION

Example aspects of the present invention provide a sufficiently high top speed and grade climbing ability for the vehicle having an electrically driven vehicle axle with a portal axle drive, i.e., having a portal axle, in particular for low-profile vehicles.

According to example aspects of the invention, the portal axle drive includes two gear stages, which are designed as portal stages with an axial or portal offset, are arranged next to each other, and are engageable via an engagement device. This yields the advantage that two gears are engageable with the portal axle drive according to example aspects of the invention, as the result of which, on the one hand—in the second gear—a higher top speed and, on the other hand—in the first gear—a higher tractive force are achievable. The engagement device is arranged directly alongside the two gear stages, i.e., outside of and not within the two gear stages. This yields a compact design for the portal axle drive. An electric vehicle is understood to be a vehicle, in particular a low-profile vehicle, which is either driven exclusively electrically, for example, by one or multiple electric machine(s), or includes a hybrid drive with an internal combustion engine and an electric machine.

According to a preferred example embodiment, both gear or portal stages each include an input pinion, an output gearwheel, and intermediate gearwheels, which are in mesh with the input pinion as well as with the output gearwheel. Therefore, on the one hand, a portal offset and, on the other hand, a power distribution via the two intermediate gearwheels are achieved. The input pinions are designed as fixed gears and the output gearwheels are designed as idler gears, which are rotatably arranged on the output shaft.

According to a further preferred example embodiment, the output gearwheel of the second gear stage, the second output gearwheel, is rotatably arranged on the output gearwheel of the first gear stage, the first output gearwheel. This yields the advantage that the first output gearwheel as well as the second output gearwheel are easily coupleable with the engagement device arranged alongside the second output gearwheel. Installation space is therefore saved in the axial direction.

According to a further preferred example embodiment, the output gearwheel of the first gear stage includes a neck, which acts as a bearing base for the output gearwheel of the second gear stage. Simultaneously, a connection to the engagement device is created by the neck, which is designed as a hollow shaft and transmits the torque.

According to a further preferred example embodiment, the first output gearwheel includes a first driving toothing and the second output gearwheel includes a second driving toothing, while the engagement device includes a synchronizer sleeve with corresponding driving toothings. It is therefore ensured that either the first driving toothing or the second driving toothing can be brought into engagement with the corresponding driving toothing of the synchronizer sleeve. Thus, a first gear and a second gear are engageable.

According to a further preferred example embodiment, the engagement device is hydraulically or pneumatically actuatable. In the process, the synchronizer sleeve is displaced into a particular engagement position by a shifting force generated by the hydraulic or pneumatic pressure.

According to a further preferred example embodiment, the engagement device includes an axially displaceable hydraulic piston, which is acted upon by a hydraulic medium or fluid and is kinematically coupled to the synchronizer sleeve. The movement of the hydraulic piston in the axial direction is therefore transmitted onto the synchronizer sleeve, which brings about a coupling or decoupling of the idler gears.

According to a further preferred example embodiment, the synchronizer sleeve is arranged on the output shaft in a rotationally fixed, although axially displaceable, manner. Preferably, this arrangement can be implemented by a driving toothing or spline. Therefore, the torque of the idler gears can be transmitted onto the output shaft via the synchronizer sleeve.

According to a further preferred example embodiment, the output shaft is drivingly connected to a planetary gear set. Preferably, the output shaft of the portal axle drive drives the sun gear shaft of the planetary gear set, wherein the ring gear shaft of the planetary gear set is fixed or held in place, i.e., supported against the housing. The output of the planetary gear set takes place via the carrier shaft onto the driving wheel of the vehicle.

According to a further preferred example embodiment, the driven carrier shaft of the planetary gear set is integrated into a wheel hub of a driving wheel, i.e., the carrier shaft is part of the wheel hub and, thereby, drives the driving wheel.

According to a further preferred example embodiment, the vehicle axle includes a housing and a hub carrier fixedly connected to the housing, in which the two gear or portal stages and the engagement device with the hydraulic piston are arranged. The portal axle drive can therefore be accommodated in the housing and in the hub carrier compactly and close to the wheel.

BRIEF DESCRIPTION OF THE DRAWINGS

An exemplary embodiment of the invention is represented in the drawing and is described in greater detail in the following, wherein further features and/or advantages can result from the description and/or the drawing, in which:

FIG. 3 shows an enlarged partial section of the portal axle drive with an engagement device;

FIG. 4 shows an axial section in the area of the intermediate gears of the portal axle drive;

DETAILED DESCRIPTION

Figure 1:
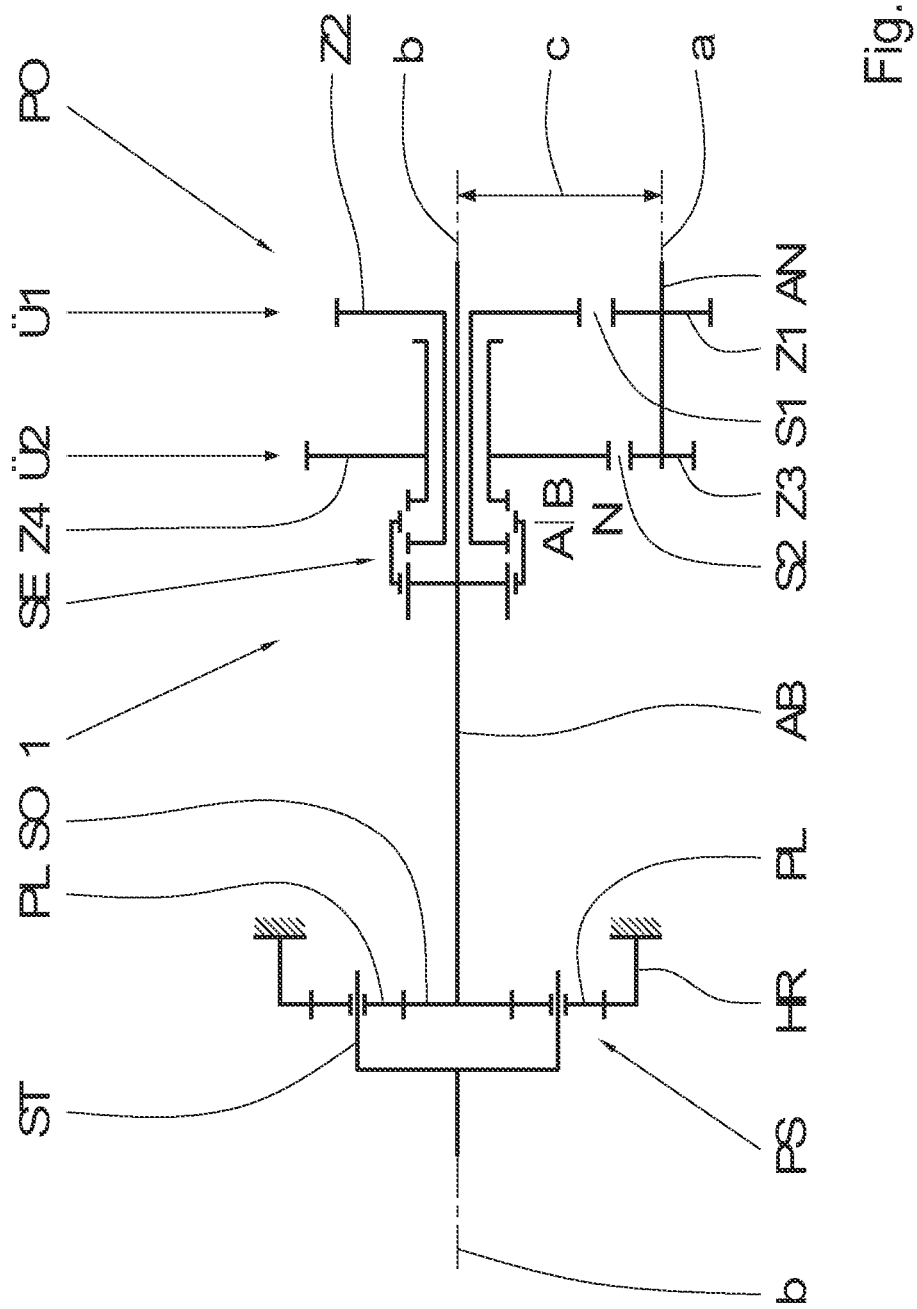
FIG. 1 shows a transmission diagram of the portal axle drive according to example aspects of the invention for an electrically drivable vehicle axle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 5:
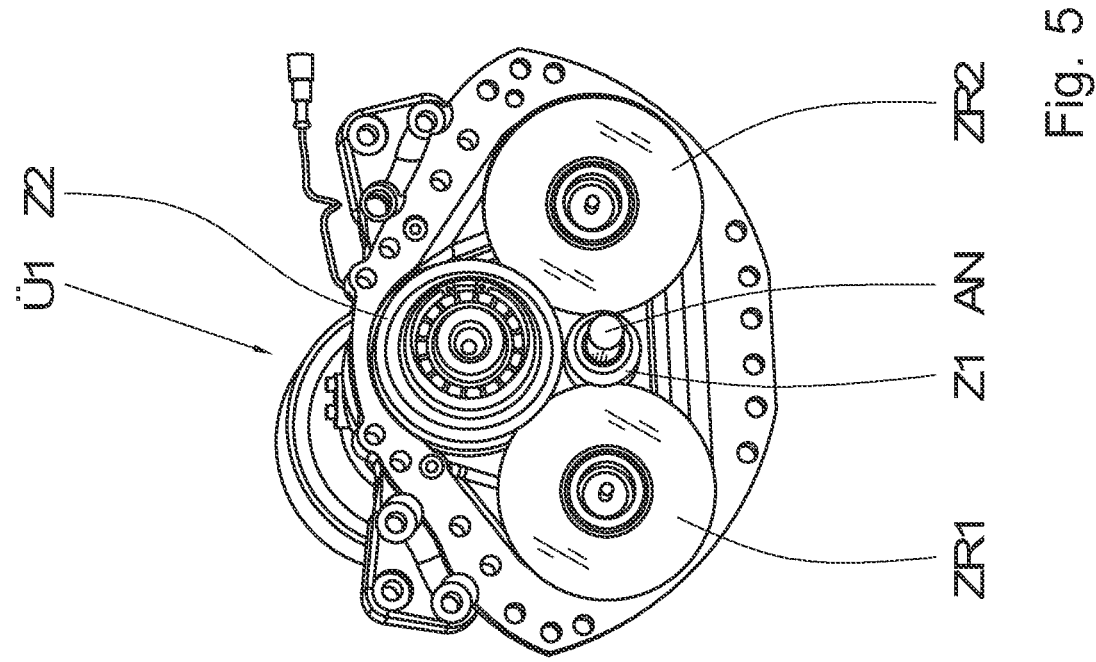
FIG. 5 shows a view in the axial direction toward the first gear stage with intermediate gears.
Figure 6:
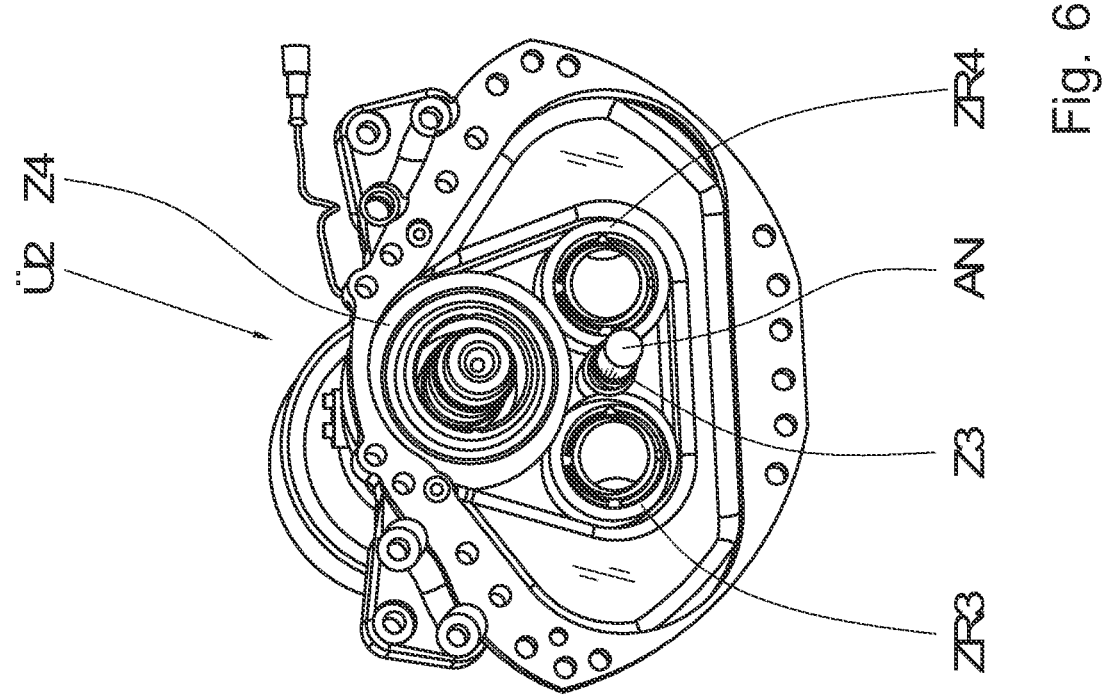
FIG. 6 shows a view toward the second gear stage with intermediate gears.

FIG. 1 shows a transmission diagram 1, i.e., a schematic of a portal axle drive PO according to example aspects of the invention, and a planetary gear set PS, which is drivable by the portal axle drive PO. The portal axle drive PO is preferably utilized for the propulsion of an electric vehicle, in particular an electrically driven low-profile vehicle. The portal axle drive PO includes a drive shaft AN with an input axis a and an output shaft AB with an output axis b, which is identical to the wheel axis b. The input axis a and the output axis b, which is arranged above the input axis a in the drawing and in the vehicle, have a center distance c, which is also referred to as an axial or portal offset c. The drive shaft AN can be driven (not represented) by an axle shaft of an axle differential of the vehicle. The portal axle drive PO has two gear stages, a first gear stage Ü1 and a second gear stage Ü2, which are engageable by an engagement device SE. The first gear stage Ü1 includes a first gearwheel Z1 (also referred to as a fixed gear Z1) arranged on the drive shaft AN in a rotatably fixed manner and a second gearwheel Z2 (also referred to as an idler gear Z2) rotatably arranged on the output shaft AB. As is apparent from the drawing, the first gearwheel Z1 and the second gearwheel Z2 are not in mesh with each other in the plane of the drawing. Rather, a gap s1 has been left between the two gearwheels Z1, Z2. The power transmission from the driving first gearwheel Z1 onto the driven second gearwheel Z2 takes place via two intermediate gears arranged in front of and behind the plane of the drawing, which are in mesh with the first gearwheel Z1 as well as with the second gearwheel Z2; a split of the power flow takes place as a result. A view in the axial direction toward the first gear stage Ü1 with the intermediate gears ZR1, ZR2 is represented in FIG. 5 and explained in greater detail with reference thereto. The second gear stage Ü2 includes a third gearwheel Z3 (also referred to as a fixed gear Z3) arranged on the drive shaft AN in a rotatably fixed manner and a fourth gearwheel Z4 (also referred to as an idler gear Z4) rotatably arranged opposite the second gearwheel Z2. Similarly to the first gear stage Ü1, the driving third gearwheel Z3 and the driven fourth gearwheel Z4 are not directly in mesh with each other. Rather, a gap s2 has been left between the two gearwheels Z3, Z4 in the plane of the drawing. The power flow in the second gear stage Ü2 also takes place, similarly to the first gear stage Ü1, via the intermediate gears ZR3, ZR4 arranged in front of and behind the plane of the drawing, which are represented in FIG. 6 and explained with reference thereto. Via the engagement device SE, which includes a synchronizer sleeve (without a reference character) displaceable in the axial direction, the drive shaft AN can be connected to the output shaft AB either via the first gear stage Ü1 or via the second gear stage Ü2. During the engagement of the first gear stage Ü1, the synchronizer sleeve is in the engagement position A. During the engagement of the second gear stage Ü2, the synchronizer sleeve is in the engagement position B. Via the synchronizer sleeve, a rotationally fixed connection is established either between the second gearwheel Z2 or between the fourth gearwheel Z4 and the output shaft AB. In a neutral position N, which is arranged between the two engagement positions A, B, no torque is transmitted between the drive shaft AN and the output shaft AB. It is pointed out that the engagement device SE is not located between the idler gears Z2, Z4, but rather outside thereof, namely adjacent to the fourth gearwheel Z4, which is mounted on a hollow shaft (without a reference character) of the second gearwheel Z2. The planetary gear set PS includes a sun gear shaft SO, a carrier shaft ST, a ring gear shaft HR supported against or fixed to the housing, and planetary gears PL mounted on the carrier shaft ST, which are in mesh with the sun gear of the sun gear shaft SO and the ring gear of the ring gear shaft HR. The planetary gear set PS is driven via the sun gear shaft SO by the output shaft AB of the portal axle drive PO. The output of the planetary gear set PS takes place via the carrier shaft ST, which can be integrated into the wheel head of a driving wheel of the vehicle.

Figure 2:
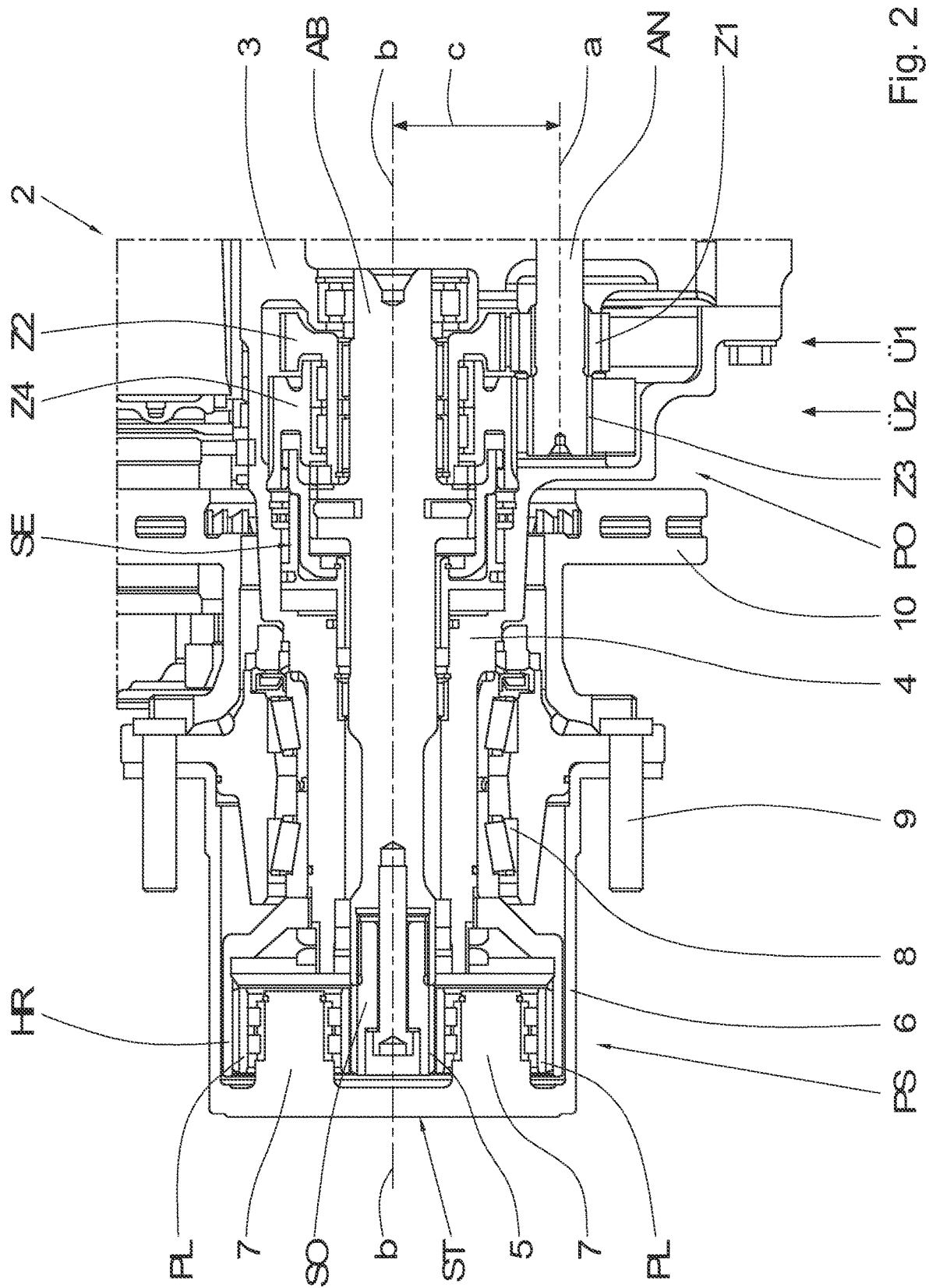
FIG. 2 shows a structural embodiment of the portal axle drive with the transmission layout according to FIG. 1.

FIG. 2 shows a structural embodiment 2 of the transmission diagram 1 according to FIG. 1. Identical reference characters are utilized for functionally identical or similar parts. The drive shaft AN, on which the fixed gears Z1, Z3 are arranged, has an axial or portal offset c with respect to the output shaft AB, on which the idler gears Z2, Z4 are mounted, wherein the input axis a is arranged below the output or wheel axis b in the drawing and also in the vehicle. The gearwheel pair Z1, Z2 forms the first gear stage Ü1 and the gearwheel pair Z3, Z4 forms the second gear stage Ü2 of the portal axle drive PO. Both gear stages Ü1, Ü2 are engaged via the engagement device SE. The portal axle drive PO is represented enlarged in FIGS. 3, 4 and is described in detail with reference thereto. The output shaft AB is mounted in a housing 3 and a hub carrier 4 and is rotationally fixed, at the end face, to the sun gear shaft SO of the planetary gear set PS. A sun gear 5 is arranged on the sun gear shaft SO. The carrier shaft ST, which is integrated into a wheel head or wheel hub 6, includes planetary gear journals 7, on which planetary gears PL are mounted. The ring gear shaft HR is supported opposite the hub carrier 4 in a rotationally fixed manner. The wheel hub 6, in which the planetary gear set PS is accommodated, is mounted opposite the hub carrier 4 via a tapered roller bearing 8. A driving wheel (not represented) of the electric vehicle is secured on the wheel hub 6 by wheel bolts 9. A brake disk 10 is rotationally fixed to the wheel hub 6.

FIG. 3 shows an enlarged representation of the portal axle drive PO, of the type previously represented in FIG. 2. Identical reference characters are utilized for identical parts. The output shaft AB is mounted opposite the housing 3 at the end via a cylindrical roller bearing 11. The idler gear Z2, which includes a neck 12 designed as a hollow shaft, is mounted on the output shaft AB via needle bearings 13 opposite the output shaft AB. The idler gear Z4 is mounted on the neck 12 of the idler gear Z2 by means of further needle bearings 14. The neck 12 of the idler gear Z2 includes a first driving toothing 15 (outer toothing) and the idler gear Z4 includes a second driving toothing 16 (inner toothing). The engagement device SE includes a synchronizer sleeve 17, which is arranged on the output shaft AB in a rotationally fixed, although axial displaceable, manner via an inner toothing 17a designed as driving toothing, and includes an outer toothing 17b designed as driving toothing. In the representation according to FIG. 3, the synchronizer sleeve 17 is in a neutral position, in which the synchronizer sleeve 17 is held by a fixing pin 18. No torque is transmitted in the neutral position. The synchronizer sleeve 17 is actuated, i.e., displaced into the two engagement positions A, B (FIG. 1), by a hydraulic piston 19, which is axially displaceably arranged in a cylindrical bore 20. The hydraulic piston 19 has a first, larger piston area 19a and a second, smaller piston area 19b, which can be acted upon by a pressure medium, preferably a hydraulic fluid.

In order to engage the first gear, i.e., the first gear stage Ü1, the synchronizer sleeve 17, which is also referred to as a gear change sleeve 17, is displaced toward the right (in the drawing) by the hydraulic piston 19, and so the inner toothing 17a of the synchronizer sleeve 17 engages into the outer toothing 15 of the idler gear Z2 and establishes a rotationally fixed, form-locking connection. In order to engage the second gear, i.e., the second gear stage Ü2, the gear change sleeve 17 is displaced toward the left (in the drawing), past the neutral position, and so the outer toothing 17b of the gear change sleeve 17 engages into the inner toothing 16 of the idler gear Z4.

FIG. 4 shows an axial section in the plane of the input axis a, the axes m1, m2, the intermediate gears ZR1, ZR2 of the first gear stage Ü1, and the axes m3, m4 of the intermediate gears ZR3, ZR4 of the second gear stage Ü2. In the plane of the drawing, the first gearwheel Z1 is meshed with the first intermediate gear ZR1 and the second intermediate gear ZR2; the third gearwheel Z3 is meshed with the two intermediate gears ZR3, ZR4.

FIG. 5 shows a 3D representation with a view in the direction of the drive axle AN toward the first gear stage Ü1 with a driving first gearwheel Z1, the two intermediate gears ZR1, ZR2, and the driven second gearwheel Z2. It is apparent from this representation that the power output by the driving first gearwheel Z1 is distributed onto the two intermediate gears ZR1, ZR2 and, by these, is transmitted onto the driven second gearwheel Z2. Due to this power distribution, the tooth systems and the shaft bearings are loaded to a lesser extent.

FIG. 6 shows a 3D representation similar to that in FIG. 5, although with a view toward the second gear stage Ü2, which is formed by the driving third gearwheel Z3, the two intermediate gears ZR3, ZR4, and the driven fourth gearwheel Z4. In comparison to FIG. 5, the different diameter proportions for the first gear stage Ü1 and the second gear stage Ü2 are readily apparent.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission diagram
2 structural embodiment
3 housing
4 hub carrier
5 sun gear
6 wheel hub
7 planetary gear journal
8 tapered roller bearing
9 wheel bolt
10 brake disk
11 cylindrical roller bearing
12 neck of the second gearwheel
13 needle bearing
14 needle bearing
15 first driving toothing (Z2)
16 second driving toothing (Z4)
17 synchronizer sleeve/gear change sleeve
17a inner driving toothing
17b outer driving toothing
18 fixing pin
19 hydraulic piston
19a first piston area
19b second piston area
20 cylindrical bore
A first engagement position
a input axis
AB output shaft
AN drive shaft
B second engagement position
b output and wheel axis c portal offset
HR ring gear shaft
m1 axis (ZR1)
m2 axis (ZR2)
m3 axis (ZR3)
m4 axis (ZR4)
N neutral position
PL planetary gear
PO portal axle drive
PS planetary gear set
s1 gap
s2 gap
SE engagement device
SO sun gear shaft
ST carrier shaft
Ü1 first gear stage
Ü2 second gear stage
Z1 first gearwheel (fixed gear)
Z2 second gearwheel (idler gear)
Z3 third gearwheel (fixed gear)
Z4 fourth gearwheel (idler gear)
ZR1 first intermediate gear
ZR2 second intermediate gear
ZR3 third intermediate gear
ZR4 fourth intermediate gear

The invention claimed is:

1. A portal axle drive for a vehicle axle of an electric vehicle with driving wheels, comprising:
   a drive shaft (AN) with an input axis (a);
   an output shaft (AB) with an output and wheel axis (b), the input axis (a) and the output axis (b) have a portal offset (c);
   a first gear stage (Ü1) arranged between the drive shaft (AN) and the output shaft (AB);
   a second gear stage (Ü2) arranged next to the first gear stage (Ü1) in an axial direction; and
   an engagement device (SE) arranged next to the second gear stage (Ü2) in an axial direction, the first gear stage (Ü1) and the second gear stage (Ü2) engageable via the engagement device (SE),
   wherein each of the first gear stage (Ü1) and the second gear stage (Ü2) include an input pinion (Z1, Z3), an output gearwheel (Z2, Z4), and two intermediate gears (ZR1, ZR2, ZR3, ZR4),
   wherein the input pinions (Z1, Z3) of the first and second gear stages (Ü1, Ü2) are configured as fixed gears on the drive shaft (AN),
   wherein the output gearwheels (Z2, Z4) of the first and second gear stages (Ü1, Ü2) are configured as idler gears on the output shaft (AB), and
   wherein the output gearwheel (Z4) of the second gear stage (Ü2) is rotatably arranged on the output gearwheel (Z2) of the first gear stage (Ü1).

2. The portal axle drive of claim 1, wherein the output gearwheel (Z2) of the first gear stage (Ü1) comprises a neck (12), and the output gearwheel (Z4) of the second gear stage (Ü2) is mounted on the neck (12).

3. The portal axle drive of claim 1, wherein:
   the output gearwheel (Z2) of the first gear stage (Ü1) has a first driving toothing (15);
   the output gearwheel (Z4) of the second gear stage (Ü2) has a second driving toothing (16);
   the engagement device (SE) comprises a synchronizer sleeve (17) with corresponding driving toothings (17a, 17b); and
   either a first gear or a second gear is engageable by meshing the first driving toothing (15) or the second driving toothing (16) with the corresponding driving toothings (17a, 17b) of the synchronizer sleeve (17).

4. The portal axle drive of claim 3, wherein the engagement device (SE) is hydraulically or pneumatically actuatable.

5. The portal axle drive of claim 4, wherein the engagement device (SE) comprises an axially displaceable hydraulic piston (19) coupled to the synchronizer sleeve (17).

6. The portal axle drive of claim 3, wherein the synchronizer sleeve (17) is arranged on the output shaft (AB) in a rotationally fixed and axially displaceable manner.

7. The portal axle drive of claim 1, wherein the output shaft (AB) is drivingly connected to a planetary gear set (PS).

8. The portal axle drive of claim 7, wherein the planetary gear set (PS) comprises a sun gear shaft (SO) drivable by the output shaft (AB), a ring gear shaft (HR) fixed in place, and a driven carrier shaft (ST).

9. The portal axle drive of claim 8, wherein the carrier shaft (ST) is integrated into a wheel hub (6) of a driving wheel.

10. The portal axle drive of claim 1, wherein the vehicle axle comprises a housing (3) and a hub carrier (4), and the first and the second gear stages (Ü1, Ü2) and the engagement device (SE) with a hydraulic piston (19) are arranged within the housing (3) and the hub carrier (4).

* * * * *